United States Patent [19]
Kobayashi et al.

[11] Patent Number: 5,603,977
[45] Date of Patent: Feb. 18, 1997

[54] GUMMY STARCH AND METHOD FOR PREPARATION OF THE SAME

[75] Inventors: Shoichi Kobayashi; Wakako Tsuzuki; Koji Sakurai, all of Ibaraki; Yoshio Itoh, Tokyo, all of Japan

[73] Assignees: Director of National Food Research Institute, Ministry of Agriculture, Forestry and Fisheries, Ibaraki; Lotte Central Laboratory Co., Ltd., Tokyo, both of Japan

[21] Appl. No.: 414,171

[22] Filed: Mar. 31, 1995

[30] Foreign Application Priority Data

Mar. 31, 1994 [JP] Japan ................................ 6-083774

[51] Int. Cl.$^6$ .................................................. A23L 1/0522
[52] U.S. Cl. .......................... 426/578; 127/34; 426/658
[58] Field of Search ................................. 426/578, 658, 426/579; 127/34

[56] References Cited

U.S. PATENT DOCUMENTS

| | | | |
|---|---|---|---|
| 3,883,666 | 5/1975 | Teng et al. | 426/3 |
| 4,138,271 | 2/1979 | Ohira et al. | 426/540 |
| 5,149,799 | 9/1992 | Rubens | 536/102 |
| 5,206,046 | 4/1993 | Seeds | 426/589 |

*Primary Examiner*—Jeanette Hunter
*Attorney, Agent, or Firm*—Young & Thompson

[57] ABSTRACT

A gummy starch is prepared by conmbining a starch with a saccharide and subsequently heating up the mixture. The gummy starch consists essentially of a water insoluble part with a chewable property and good dispersibility in oils and fats. A process for preparation of a gummy starch comprises the steps of combining a starch with a saccharide and heating up the mixture at such a temperature for such a time as to cause the saccharide to be caramelized to pick up water insoluble part. A chewable food raw material consists essentially of a gummy starch prepared by combining a starch with a saccharide and subsequently heating up the mixture. An oil and fat dispersant consists essentially of a gummy starch prepared by combining a starch with a saccharide and subsequently heating up the mixture.

8 Claims, 11 Drawing Sheets

GUMMY STARCH AND METHOD FOR PREPARATION OF THE SAME

BACKGROUND OF THE INVENTION

1. Field of the Invention

The invention relates to a gummy starch having a gummy property and a method for preparation of the same by changing a property of the starch.

2. Description of the Related Art

As gummy substances, guar gum, locust bean gum, tamarind seed gum, tare gum, acacia gum, gum Arabic, tragacanth gum, karaya gum and the like have been known in the art.

Particularly, gum Arabic is superior in fat dispersibility such that a stable emulsion is obtainable in the presence of various food materials. For this reason, gum Arabic has been widely available in producing various foods. Recently, however, it is more difficult to obtain gum Arabic due to lack of raw material thereof and it has therefore become expensive. Accordingly, the use of gum Arabic for foods has become more difficult.

Use of a starch system as a substitute has been considered as starch systems are readily available at a low cost. A first example is roasted dextrin. The roasted dextrin may prepared by subjecting powdered starches to a heat treatment in the temperature range from 110° C. to 220° C. in the presence of or the absence of catalyst. There are, for example, British gum produced with no acid or by adding alkali additive and roasting, and a white or yellow dextrin produced by adding a small mount of mineral acid and a heat treatment. The roasted dextrin is soluble in cold water and has a strong stickiness.

British gum has a similar property to the gum Arabic and thus is superior in emulsifying stability and adhesive properties. Thus, British gum may be used as an industrial emulsifying stabilizing agent or a binder in place of or in partial replacement of the gum Arabic. Further there are decomposed starches, pre-gelatinized starches, oxidized starches, a starch esterificated from starch derivatives and ether starch.

Recently, it has been found that chewing promotes brain activity, for which reason interest in chewing food materials has been on the increase. As described above, the starch system materials already known are not especially gummy materials as would have gummy properties such as flexibility and elasticity. Whereas a number of scientists or experts tried to make gummy materials through the change as described above, for example, by roasting the starch into various types of starch, no success therein has ever been obtained.

SUMMARY OF THE INVENTION

Accordingly, it is an object of the present invention to provide a gummy starch having desirable gummy properties and a method for preparation of the same from a readily available starch.

The present invention provides a gummy starch prepared by combining a starch and saccharide, and subsequently heating the mixture. The gummy starch consists essentially of a water insoluble part which has a chewable property and good dispersibility in oils and fats. The starch is one or a mixture selected from the group consisting of corn starch, sweet potato starch, potato starch, rice starch, wheat starch, sago starch and tapioca starch and the saccharide is one or a mixture selected from the group consisting of maltose, saccharose, glucose, fructose, powder corn syrup, arabinose and xylose and wherein a weight ratio of the saccharide to the starch 5 to 50%.

The present invention also provides a process for preparation of a gummy starch comprising the steps of combining starch and saccharide, and heating the mixture at such a time as to cause the saccharide to be caramelized to pick up the water insoluble part.

BRIEF DESCRIPTION OF THE DRAWINGS

Preferred embodiments of the present invention will be described in detail with reference to the accompanying drawings.

DETAILED DESCRIPTION OF THE PREFERRED EMBODIMENTS

The present invention was conceived by the following viewpoints. Considering production of a gummy material with a good chewing property from starches, it was found possible to combine the starch and a saccharide at 5 to 50% in a ratio of amount to the starch for heat treatment thereof at a temperature in the range from 150° to 220° C. to cause a change of the property of the starch into a gummy property thereby a gummy raw material is obtained. The saccharide may be maltose, saccharose, glucose, powdered corn syrup, arabinose fructose or xylose. The gummy starch may be available for chewing food raw materials and food raw materials having good dispersibility in oils and fats.

Figure 1:
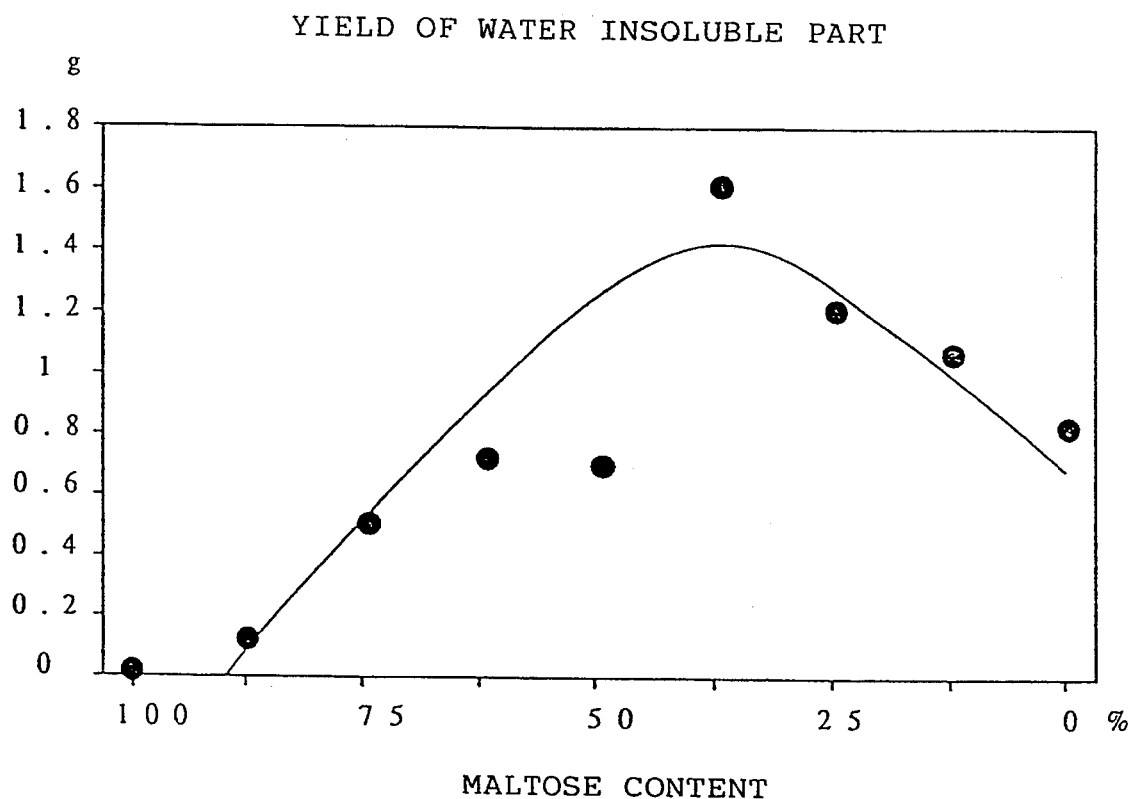
FIG. 1 is a diagram illustrative of a variation in the yield of a novel gummy starch according to the present invention with reference to variation of an amount of maltose used in the starch.

Corn starch is added and mixed with maltose and subjected to a heat treatment at a high temperature to cause change in a property thereof. As illustrated in FIG. 1, addition of 37.5 to 25% of maltose, produces water insoluble brown powder. Namely, 4 g of the mixture is introduced in a glass vial for a heat treatment at a temperature of 170° C. in oil bath for seven hours during which stirrings are discontinuously carried out at a time interval of 15 minutes. Thereafter, the treated powder is mixed with water for subsequent centrifugal precipitation and washing to remove water soluble part thereof, so as to leave only the water insoluble part to be subjected to an air drying to produce brown powder.

A continuous stirring may promote reaction effectively. The above processes were carried out in an open system. If the processes are, however, carried out under the closed system, high pressure or vacuum condition, then the yield will be increased. When the mass production is required, it is preferable to use a kneader-mixer. The water insoluble powder is colored brown and has a slight aromatic flavor, but in selecting the closed system, reduced pressure or the vacuum conditions, the product is light in color. If light color product is required, it is preferable to carry out positive decoloring treatment such as ion exchange resin treatment and hydrogenation.

A water soluble part of the reactant obtained by heating is gathered to dry the same to cause light yellow and brown powder to be formed with a caramel smell, and which has almost no saccharides such as maltose but has furfural or maltol which are probably generated by decomposition of the maltose.

Practically, it is possible not to separate the reactant into the water soluble and insoluble parts but this results in some deterioration of the chewing property thereof and unique flavor and good taste. The water insoluble part is combined with a small amount, for example, 5 to 20% of water to become paste and is then mixed with oily mattes such as glycerol and olive oil, resulting in a gummy material with a good chewing property.

If only starch is roasted, the gummy starch of the present invention will then be obtained. Moreover, a mixture of starch with sugar alcohol will not produce the product of the present invention.

The starch to be used in the present invention is not limited, and corn, potato, sweet potato, wheat, rice, tapioca, sago and the like are available alone or in combination. Corn starch is most available in low cost and high quality.

In the present invention, suitable saccharides include pentose such as arabinose, xylose and ribose as well as hexose such as glucose, mannose, galactose, fructose and sorbose, namely various reducing sugars and further disaccharides such as maltose, isomaltose, cellobiose, saccharose and furthermore various oligosaccharides and non-reducing sugars but both of which are readily decomposed by heat treatment to change to a brown color. The above saccharides may be alone or in combination. Moreover, caramel saccharides are also available. The addition of maltose allows obtaining gummy starch having an optimized property in chewing and dispersibility in oils and fats. The use of saccharose, glucose or fructose results in a slight deterioration of chewing property.

Amount of addition may be selective factor to match the reaction conditions and purposes. Provided that at 170° C., in the open system, a stirring reaction with 15 minutes time interval was carried out, addition of maltose in the range of weight ratio of maltose to starch from 30% to 60% results in about 60% yield of water insoluble part from the starch, but the range from 5 to 50% is suitable.

Figure 2:
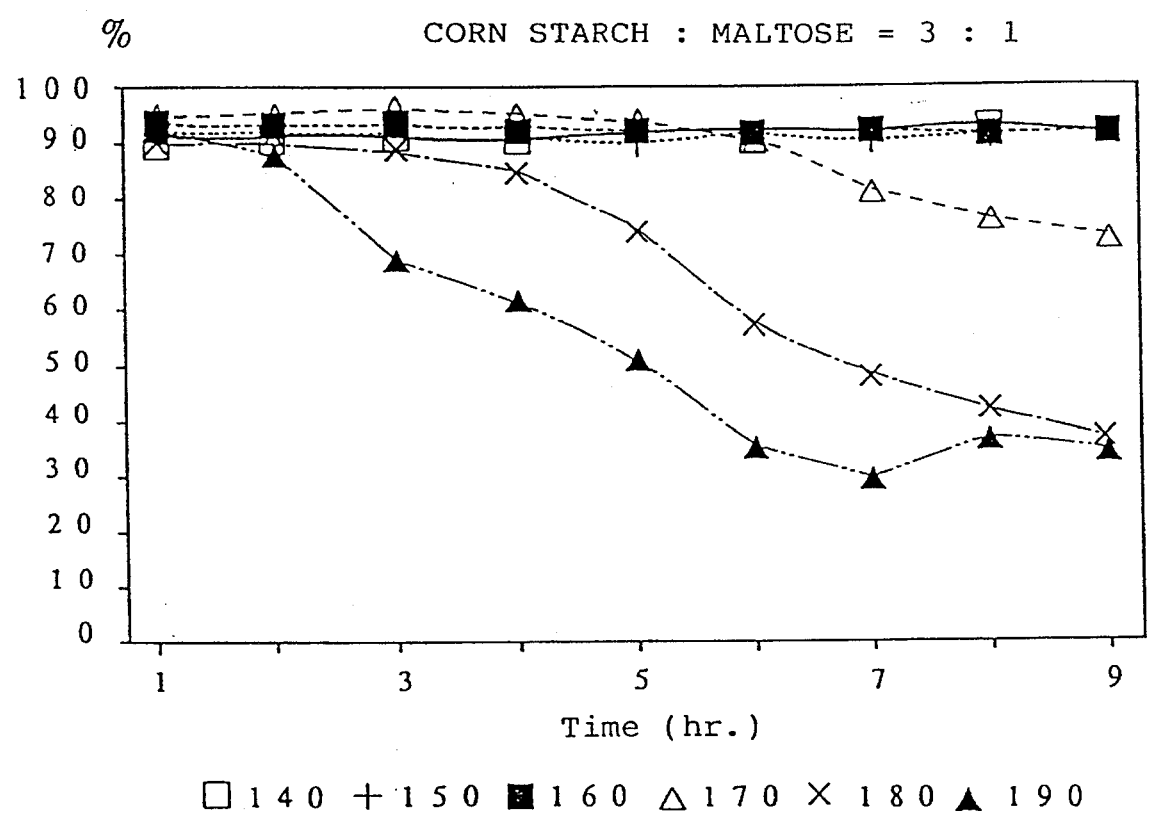
FIG. 2 is a diagram illustrative of characteristic curves representing a variation in the yield of a novel gummy starch according to the present invention with reference to a temperature of heat treatment and a time therefor.
Figure 3:
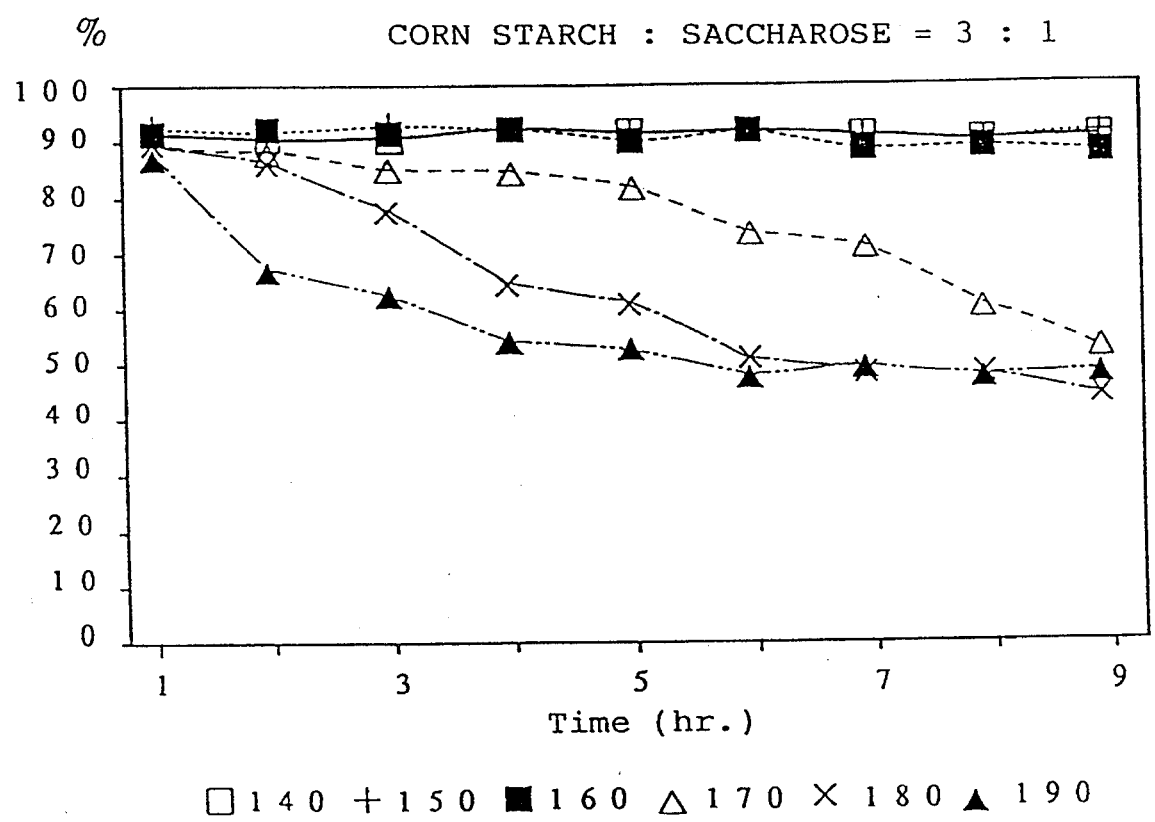
FIG. 3 is a diagram illustrative of characteristic curves representing a variation in the yield of another novel gummy starch according to the present invention with reference to a temperature of heat treatment and a time therefor.
Figure 4:
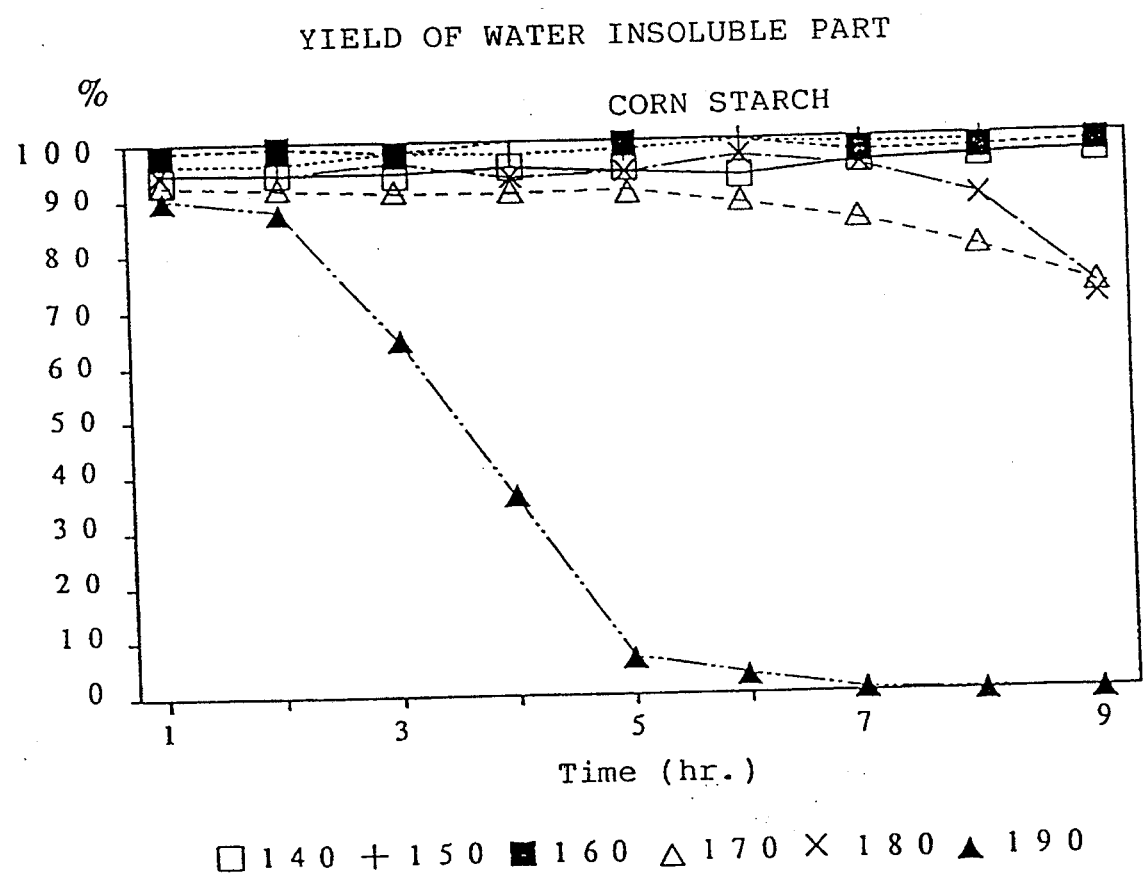
FIG. 4 is a diagram illustrative of characteristic curves representing a variation in the yield of roasted starch as a comparative example with references to a temperature of heat treatment and a time therefor.

The available temperature for heat treatment is determined with reference to a time thereof to cause the saccharide to be caramelized, preferably in the range of from 150° C. to 220° C. If the heat treatment was carried out at a temperature over 220° C., then it is necessary to shorten the time for heat treatment. Accordingly, the heat time has to be selected in reference to the temperature thereof and to match the purpose and conditions. FIGS. 2, 3 and 4 represent yields of water insoluble part under the conditions of respective ratios of corn starch to maltose equal to 3:1, corn starch to saccharose equal to 3:1, and corn starch alone provided that a heat treatment at various temperatures for 9 hours was carried out.

When the starch alone was subjected to a heat treatment, then at a temperature of 170° C. to 180° C. water insoluble part of the starch is obtainable as illustrated in FIG. 4 but the part is like white dextrin, is soluble in hot water and has less chewing property. Under the above conditions, it is difficult to obtain the product of the present invention. Addition of maltose or saccharose or other various saccharides may produce a high molecular part consisting of a water insoluble gummy starch having good chewing property and good dispersibility in oils and fats.

The gummy starch according to the present invention is available in view of its good chewing property as raw material for chewing gum like foods and candy and further in view of its good dispersibility in oils and fats it may be used as emulsifying agents such as dressing for various foods. To further increase the emulsifying agents, cyclodextrin, particularly β-cyclodextrin may be mixed.

The mixture with oils and fats allows the utilization as calorie control food raw materials and also as retrogradation prevention agent.

According to the present invention, the starch is mixed with saccharides such as maltose and subjected to a high temperature heat treatment whereby a remarkable change in property occurs to produce a novel gummy starch which is superior in chewing property and dispersibility in oils and fats. The novel gummy starch may be prepared by simple processes using low cost materials. The novel gummy starch is applicable to various foods for example chewing gum, candy, gummy food, dressing and calorie control foods and other raw materials and retrogradation preventing agents.

EXAMPLES

Example 1

Corn starch was mixed with maltose at a weight ratio of 3:1 and 4 g of the mixture was then subjected to a heat treatment at a temperature of 170° C. for seven hours in an open system. The water soluble part thereof was removed, followed by subsequent drying to thereby obtain about 1.35 g of brown powder.

Example 2

Corn starch was mixed with maltose at a weight ratio of 1:1 and 4 g of the mixture was then subjected to a heat treatment at a temperature of 170° C. for seven hours in an open system. The water soluble part thereof was removed, and the remainder subsequently dried to thereby obtain about 1.3 g of brown powder.

Example 3

Corn starch was mixed with maltose at a weight ratio of 4:1 and 4 g of the mixture was then subjected to a heat treatment at a temperature of 170° C. for seven hours in an open system. The water soluble part thereof was removed, and the remainder subsequently dried to thereby obtain about 1.2 g of brown powder.

Example 4

Corn starch was mixed with maltose at a weight ratio of 19:1 and 4 g of the mixture was then subjected to a heat treatment at a temperature of 170° C. for seven hours in an open system. The water soluble part thereof was removed, and the remainder subsequently dries to thereby obtain about 0.8 g of brown powder.

Example 5

Corn starch was mixed with maltose at a weight ratio of 3:1 and the mixture was then subjected to a heat treatment at a temperature of 190° C. for five hours in an open system. The water soluble part thereof was removed, and the remainder subsequently dried to thereby obtain brown powder at a yield of 50%.

Example 6

Corn starch was mixed with maltose at a weight ratio of 3:1 and the mixture was then subjected to a heat treatment at a temperature of 150° C. for 24 hours in an open system. The water soluble part thereof was removed, and the remainder subsequently dried to thereby obtain brown powder at a yield of 50%.

Example 7

Corn starch was mixed with maltose at a weight ratio of 3:1 and the mixture was then subjected to a heat treatment at a temperature of 220° C. for 1.5 hours in an open system. The water soluble part thereof was removed, and the remainder subsequently dried to thereby obtain brown powder at a yield of 50%.

Example 8

Corn starch was mixed with saccharose at a weight ratio of 3:1 and the mixture was then subjected to a heat treatment at a temperature of 170° C. for 7 hours in an open system. The water soluble part thereof was removed and the remainder subsequently dried to thereby obtain brown powder as for the mixture with maltose.

Example 9

Corn starch was mixed with fructose at a weight ratio of 3:1 and the mixture was then subjected to a heat treatment at a temperature of 170° C. for 5 hours in an open system. The water soluble part thereof was removed and the remainder subsequently dried to thereby obtain brown powder as for the mixture with maltose.

Example 10

Corn starch was mixed with xylose at a weight ratio of 3:1 and the mixture was then subjected to a heat treatment at a temperature of 170° C. for 4 hours in an open system. The water soluble part thereof was removed and the remainder subsequently dried to thereby obtain brown powder as for the mixture with maltose.

Example 11

In place of corn starch, sweet potato starch was used to be processed by the same processes of Examples 1 to 10 and a brown powder was obtained.

Example 12

In place of corn starch, potato starch was used to be processed by the same processes of Examples 1 to 10 and a brown powder was obtained.

Example 13

In place of corn starch, rice starch was used to be processed by the same processes of Examples 1 to 10 and a brown powder was obtained.

Example 14

In place of corn starch, wheat starch was used to be processed by the same processes of Examples 1 to 10 and a brown powder was obtained.

Example 15

In place of corn starch, sago starch was used to be processed by the same processes of Examples 1 to 10 and a brown powder was obtained.

Example 16

In place of corn starch, tapioca starch was used to be processed by the same processes of Examples 1 to 10 and a brown powder was obtained.

Comparative Example 1

In the open system, 15 g of corn starch was mixed with 5 g of maltose and heat treated at a temperature of 190° C. for seven hours, which produced brown powder at a yield of 16.24 g. Considering, in water content conversion, 2.35 g of water content in 20 g of the sample, a reducing rate was about 7%. The brown powder was washed with water and air-dried whereby the yield was reduced to 5.09 g which corresponds to 40 weight % of the starch. This starch will hereinafter be referred to as "HTCS".

HTCS obtained in this manner was mixed with corn starch, saccharose, corn syrup, olive oil and water and the like at mixing ratios according to the following Table 1, in a boiling water bath. Thereafter, the resulting gels were introduced into washers and sandwiched by glass plates to seal the same for autoclave treatment. The glass plates were then removed and the gels cut to have thicknesses thereof be uniform and subsequently sandwiched by small washers to adjust the gels to a thickness of 2.5 mm, after which the gel was left for 3 to 4 hours at a temperature of 22° C. for measurement by use of rheometer, results of which are illustrated in FIGS. 5 and 6.

TABLE 1

| HTCS content % | 100 | 80 | 60 | 40 | 20 | 0 |
|---|---|---|---|---|---|---|
| HTSC | 1 | 0.8 | 0.6 | 0.4 | 0.2 | 0 |
| Corn Starch | 0 | 0.2 | 0.4 | 0.6 | 0.8 | 1 |
| Fructose | 1 | 1 | 1 | 1 | 1 | 1 |
| Corn Syrup | 0.5 | 0.5 | 0.5 | 0.5 | 0.5 | 0.5 |
| Olive Oil | 0.05 | 0.05 | 0.05 | 0.05 | 0.05 | 0.05 |
| Glycerol | 0.05 | 0.05 | 0.05 | 0.05 | 0.05 | 0.05 |
| Water | 0.5 | 0.5 | 0.5 | 0.5 | 0.5 | 0.5 |

Figure 5:
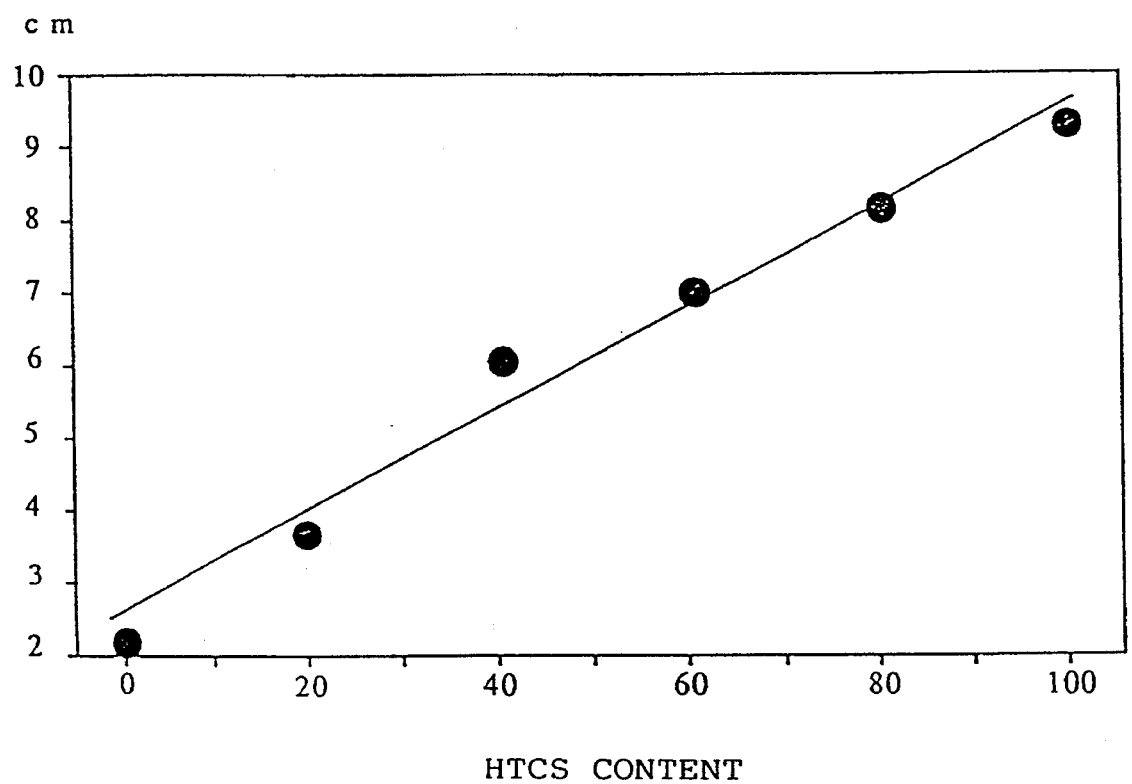
FIG. 5 is a diagram illustrative of a characteristic curve representing broken out points of gels of gummy starch measured by rheometer.
Figure 6:
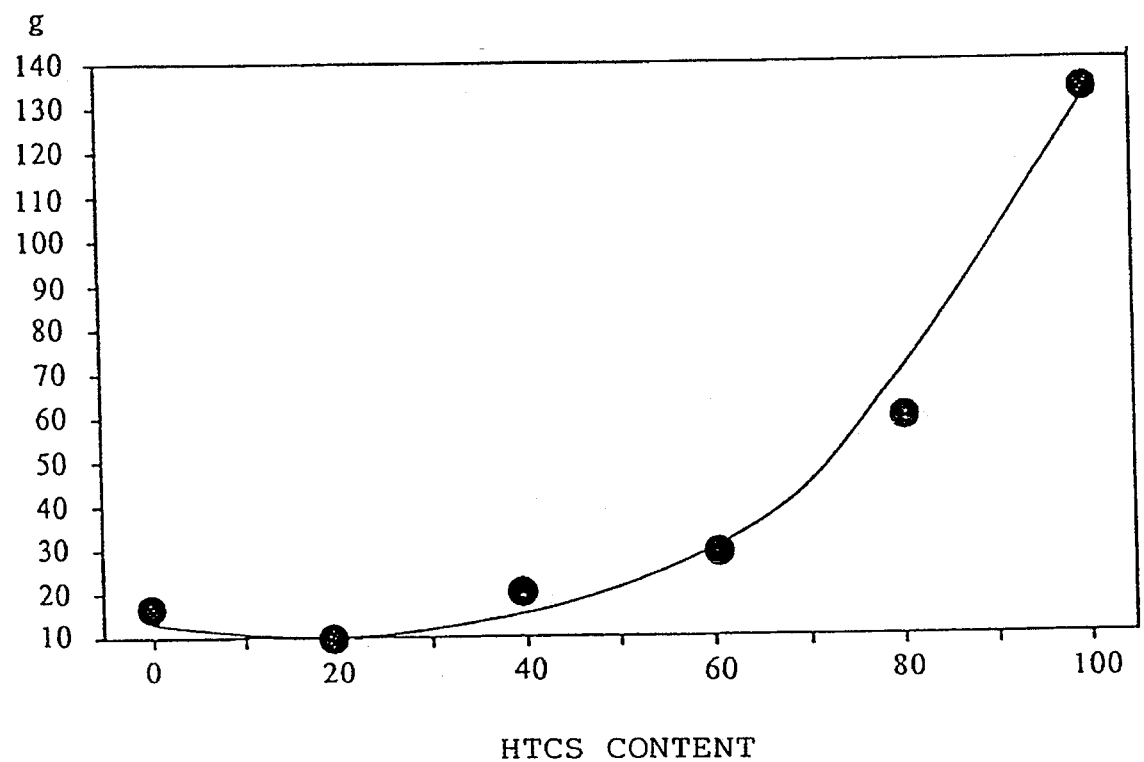
FIG. 6 is a diagram illustrative of a characteristic curve representing stresses at broken out points of gels of gummy starch measured by rheometer.

FIG. 5 illustrates a penetration distance of a top of needle sticking into the gel is just broken out. The distance increases with increasing content of HTCS. The high content of HTCS improves flexibility of the gel.

FIG. 6 illustrates a force of the needle just before the gel is broken out, form which a hardness is appreciated. The high solidity means a good chewing property.

It was confirmed that 60% or more of HTCS content may provide a good chewing property. Various chewing properties may be obtained by varying the HTCS content. Variation of the mixture compositions may also change the property.

Comparative Example 2

Examination in oils and fats dispersibility was carried out in compositions illustrated in the following Table 2.

TABLE 2

| No. | 1 | 2 | 3 | 4 | 5 | 6 |
|---|---|---|---|---|---|---|
| HTCS | 0 | 0.25 | 0.50 | 0.75 | 1.0 | 1.25 |
| Glycerol | 3.5 | 3.5 | 3.5 | 3.5 | 3.5 | 3.5 |
| Oil Essence | 1.5 | 1.5 | 1.5 | 1.5 | 1.5 | 1.5 |
| Water | 5.0 | 4.75 | 4.5 | 4.25 | 4.0 | 3.75 |
| | | | | | (gram) | |

Figure 7:
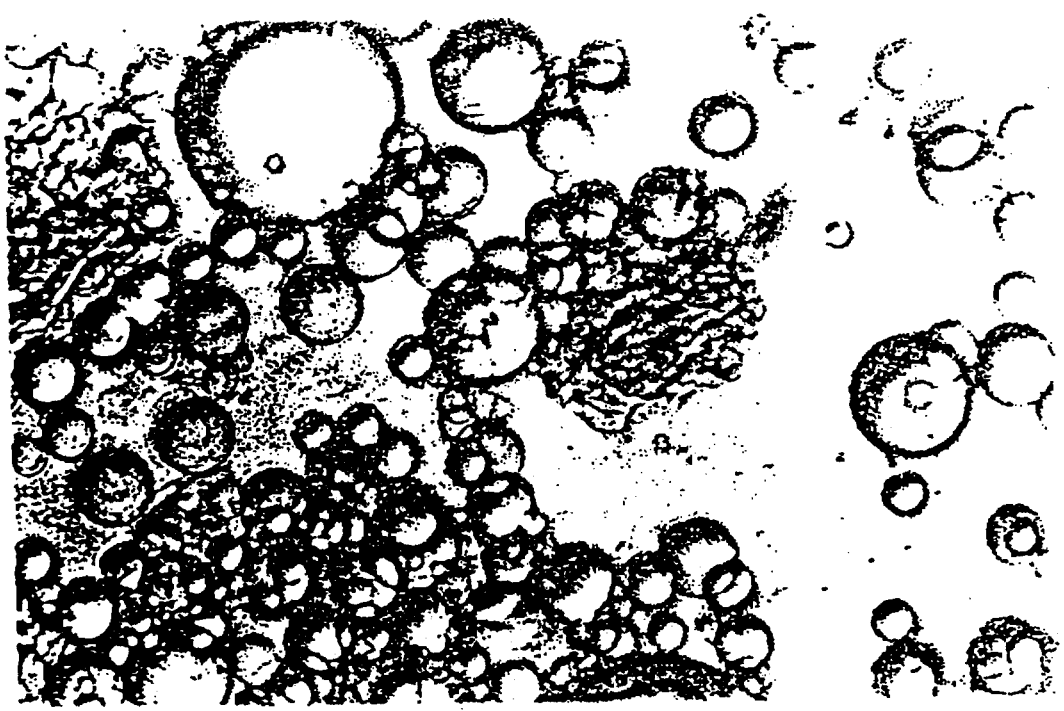
FIG. 7 is a copy of photograph illustrative of particle structures through a microscope observation at a thousand times one minute after sample No. 2 in Table 2 was homogenized for five minutes.
Figure 8:
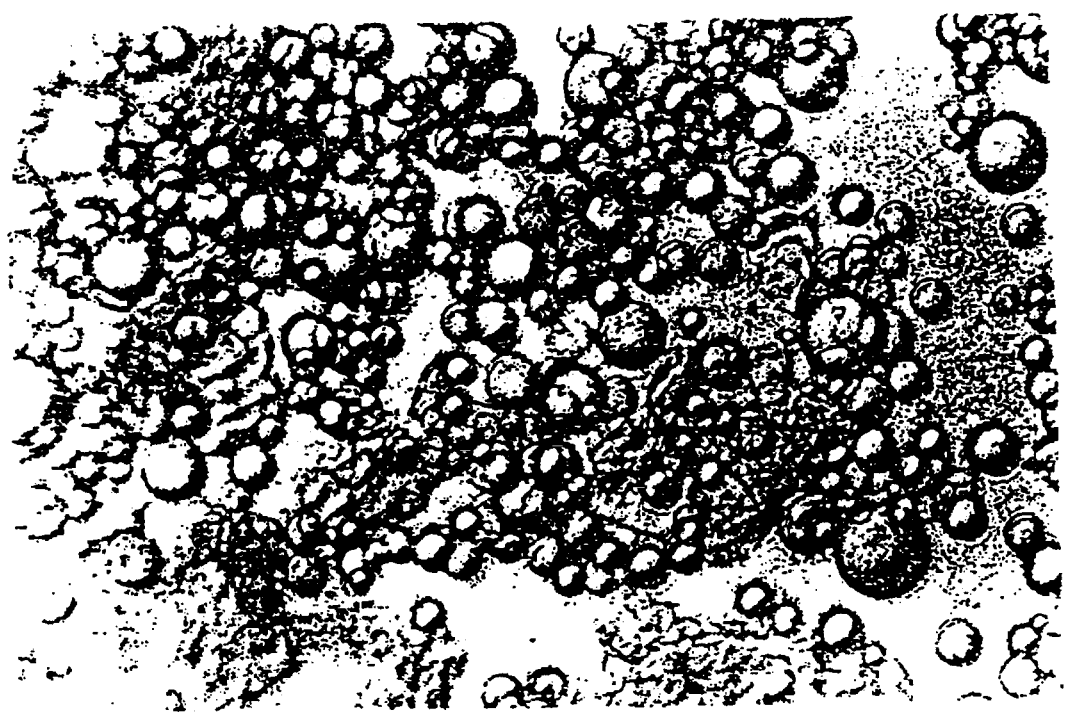
FIG. 8 is a copy of photograph illustrative of particle structures through a microscope observation at a thousand times one minute after sample No. 3 in Table 2 was homogenized for five minutes.
Figure 9:
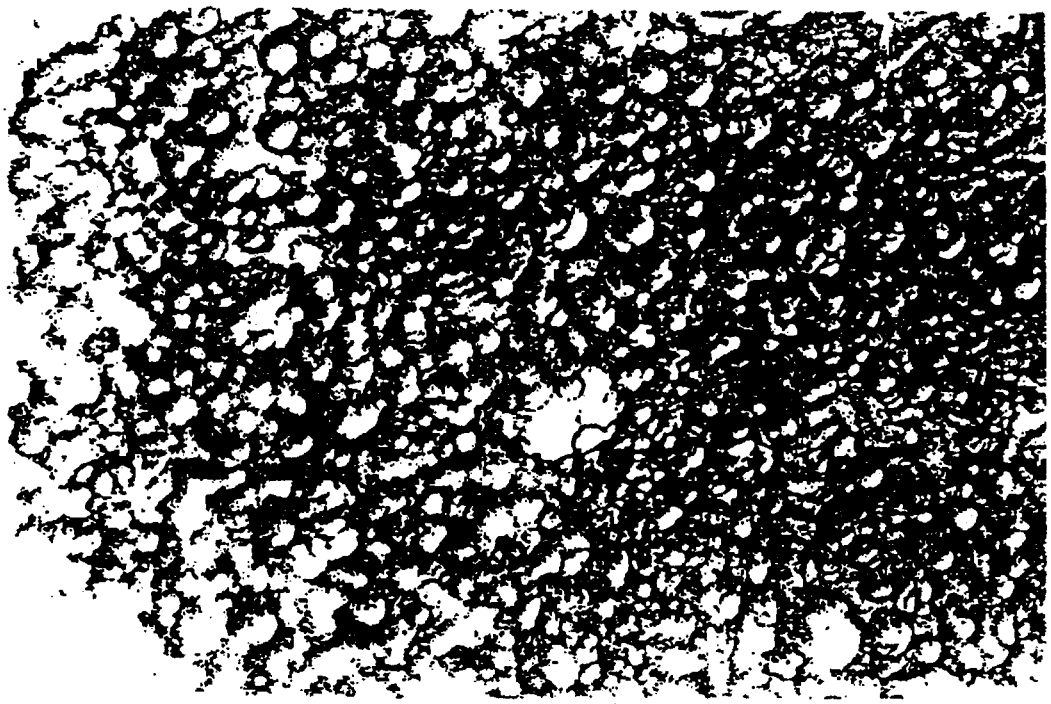
FIG. 9 is a copy of photograph illustrative of particle structures through a microscope observation at a thousand times one minute after sample No. 4 in Table 2 was homogenized for five minutes.
Figure 10:
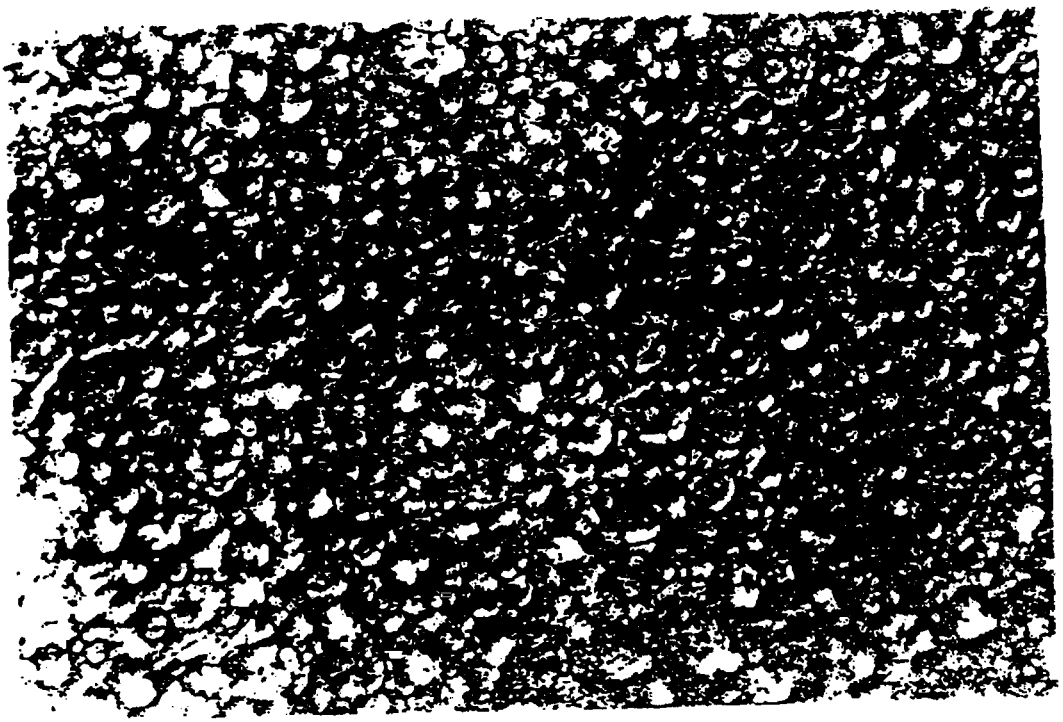
FIG. 10 is a copy of photograph illustrative of particle structures through a microscope observation at a thousand times one minute after sample No. 5 in Table 2 was homogenized for five minutes.
Figure 11:
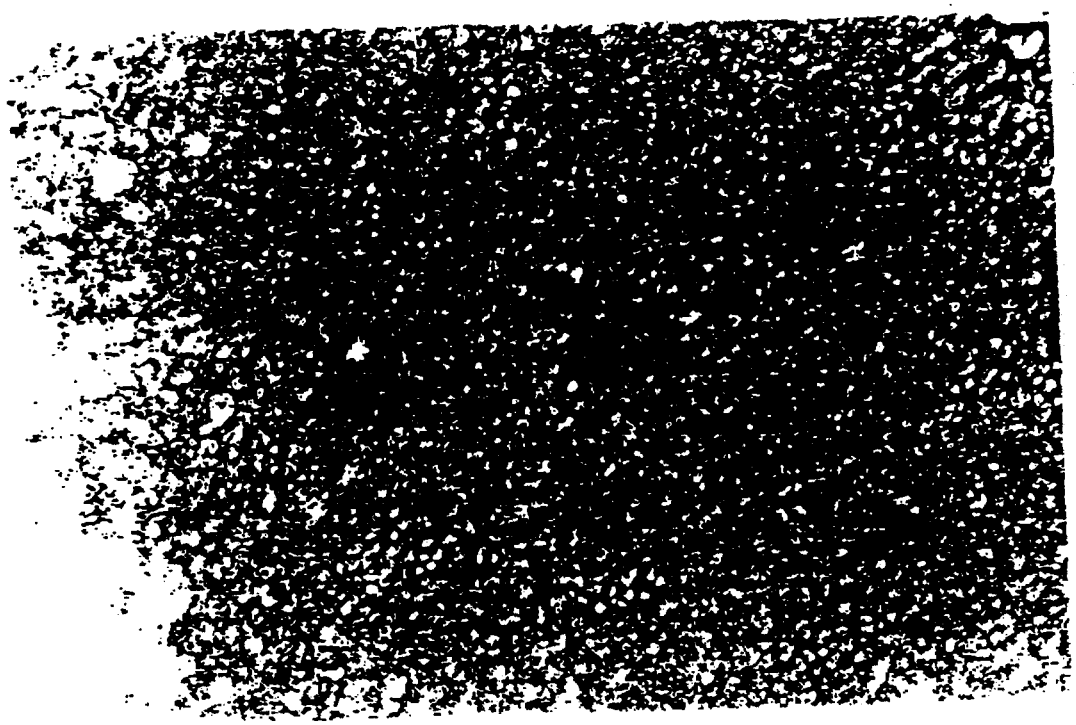
FIG. 11 is a copy of photograph illustrative of particle structures through a microscope observation at a thousand times one minute after sample No. 6 in Table 2 was homogenized for five minutes.

The composition mixtures were homogenized by homogenizing mixer for five minutes and then left for visual observation. A suspension including 7.5% HTCS after two days kept a uniform dispersion as illustrated in FIG. 7 but showed no dispersion of oily and fatty layers. A group without HTCS shows a dispersion of oil immediately. It was observed that increase of the amount of HTCS minimized oil particle diameter and improved emulsifying stability.

By contrast, for gum Arabic, a suspension of 15% HTCS is inferior as compared to the suspension of 7.5% HTCS in view of emulsifying force, from which it may be appreciated that the HTCS emulsifying force is remarkable large. If corn starch or rice starch was mixed at over 15%, then no emulsifying force was shown.

Example 17

Kneader mixer was used to mix 10 g of the HTCS obtained by Example 1 with 5 g of rice-wax, 5 g of gluten, 1 g of olive oil and 2.5 g of glycerol and thereafter 15 g of fine powdered sugar, 10 g of corn syrup and 2.5 g of essence were added in turn and mixed to subsequently prepare chewable foods for example chewing gum like food of sheet type.

Example 18

10 g of HTCS obtained in Example 2, 10 g of sugar, 5 g of corn syrup, 0.5 g of olive oil, 0.5 g of glycerol and 5 g of water were entered in a beaker within boiled water bath to be sufficiently mixed with each other, after that the beaker was picked out from boiled water bath for cooling down during which 1 g of essence was added and mixed to prepare a gummy food which was superior in dispersibility in oil and retrogradation stability.

Example 19

200 ml of water was heated up and 15 g of corn syrup and further 30 g of sugar were added thereto with stirring and continued heating during which 5 g of HTCS was added and mixed. A hardness of the product was adjusted and finally 2 g of essence was added to form candies.

Example 20

100 ml of vinegar, 100 ml of salad oil 1 g of HTCS, desired amounts of salt and pepper are mixed with each other and stirred to prepare dressing which is superior as compared to that without HTCS, in view of emulsifying stability and viscosity.

What is claimed is:

1. A gummy starch prepared by heating a mixture of raw starch and a saccharide other than starch, in the absence of added water and under temperature and time conditions effective to cause said saccharide to caramelize.

2. The gummy starch according to claim 1, wherein said gummy starch consists essentially of a water insoluble portion remaining after removal from said heated mixture of a water soluble portion, said water insoluble portion having a good chewable property and good dispersibility in oils and fats.

3. The gummy starch as claimed in claim 1, wherein said raw starch is at least one member selected from the group consisting of corn starch, sweet potato starch, potato starch, rice starch, wheat starch, sago starch and tapioca starch; and wherein said saccharide is at least one member selected from the group consisting of maltose, saccharose, glucose, fructose, powder corn syrup, arabinose and xylose; and wherein a weight ratio of said saccharide to said starch is 5–50%.

4. A process for preparing a gummy starch, comprising the steps of combining a raw starch with a non-starch saccharide to create a mixture; and heating said mixture in the absence of added water and under temperature and time conditions effective to caramelize said saccharide.

5. The process according to claim 4, wherein said heating step is performed for a time effective to cause said starch to separate into a water insoluble part and a water soluble part.

6. The process according to claim 4, wherein said starch is at least one member selected from the group consisting of corn starch, sweet potato starch, potato starch, rice starch, wheat starch, sago starch and tapioca starch; and wherein said saccharide is at least one member selected from the group consisting of maltose, saccharose, glucose, fructose, powder corn syrup, arabinose and xylose; and wherein a weight ratio of said saccharide to said starch is 5–50%.

7. The process according to claim 5, further comprising the step of separating said water insoluble part from said water soluble part.

8. The process according to claim 7, further comprising the step of dispersing said water insoluble part in oil or fat, to form a dispersion comprising a dispersed phase of said water insoluble part and a continuous phase of said oil or fat.

* * * * *